United States Patent [19]

Balogh

[11] 4,071,172

[45] Jan. 31, 1978

[54] MANUALLY OPERATED LIQUID DISPENSER

[76] Inventor: Stephen M. Balogh, 142 Brentwood Ave., Fairfield, Conn. 06430

[21] Appl. No.: 674,416

[22] Filed: Apr. 7, 1976

[51] Int. Cl.[2] .............................................. G01F 11/32

[52] U.S. Cl. ..................................... 222/321; 222/340

[58] Field of Search ............... 222/383, 384, 385, 336, 222/340, 341, 320, 321

[56] References Cited

U.S. PATENT DOCUMENTS 3,471,065 10/1969 Malone ................................ 222/321

3,949,906 4/1976 Pettersen et al. ................ 222/384 X

*Primary Examiner*—Stanley H. Tollberg

*Attorney, Agent, or Firm*—Arthur A. Johnson

[57] ABSTRACT

The liquid dispenser disclosed herein comprises two telescoping sleeves, one sleeve having a base portion to be mounted on the mouth of a container and the other sleeve forming an actuator having a discharge aperture, and a pump unit sandwiched between said sleeves and having a pump cylinder, a piston mounted in said cylinder and having a tubular piston rod connected to the spray nozzle of the actuator, and a return spring between said pump cylinder and said actuator, said spring being isolated from the liquid being pumped. The pump unit may be assembled by machine and can be tested for leakage, prime retention and operability before being inserted between the telescoping base and actuator parts, the pump unit having as a unitary part thereof a dip tube adapter to extend into the container from which the liquid is to be dispensed. The pump unit, being self-contained, may be used with various base portions designed to be mounted on container necks of different diameters.

8 Claims, 7 Drawing Figures

MANUALLY OPERATED LIQUID DISPENSER

This invention relates to liquid dispensing devices such, for instance, as are mounted on bottles, cans and the like liquid containers to atomize and spray liquid drawn from the container.

Such liquid dispensing devices usually consist of several interacting and cooperating parts, such as a part for mounting the device on a container, and a cylinder and a piston designed to operate and deliver a determinate volume of liquid for each reciprocation of an actuator.

Heretofore, due to the interlocking relationship of the pumping, operating and mounting parts it was customary, and sometimes necessary, to test the dispenser for operability to hold a prime and for leaks only after the parts were assembled, and if the dispenser was found to be defective and/or leaked, it was usually necessary that the faulty device be destroyed or discarded.

An object of this invention is to avoid the resulting loss of time, labor and material and this has been accomplished, according to this invention, by providing a pump unit which is self-contained and may be tested for leaks and operability before being assembled with the base member and the actuator for the pump.

In addition, within broad limits, the same pump unit may be assembled with base portions designed for use with containers having necks of different diameters.

Another feature of this invention is the construction of a liquid pump so that the spring, which is employed for returning the actuator to normal position after it has been operated, is isolated against coming in contact with the liquid in the container or in the pump.

Aside from the return spring, all the parts of the liquid dispenser of the present invention may be made of plastic material, such as polyethylene for instance.

Other features and advantages will hereinafter appear.

Figure 1:
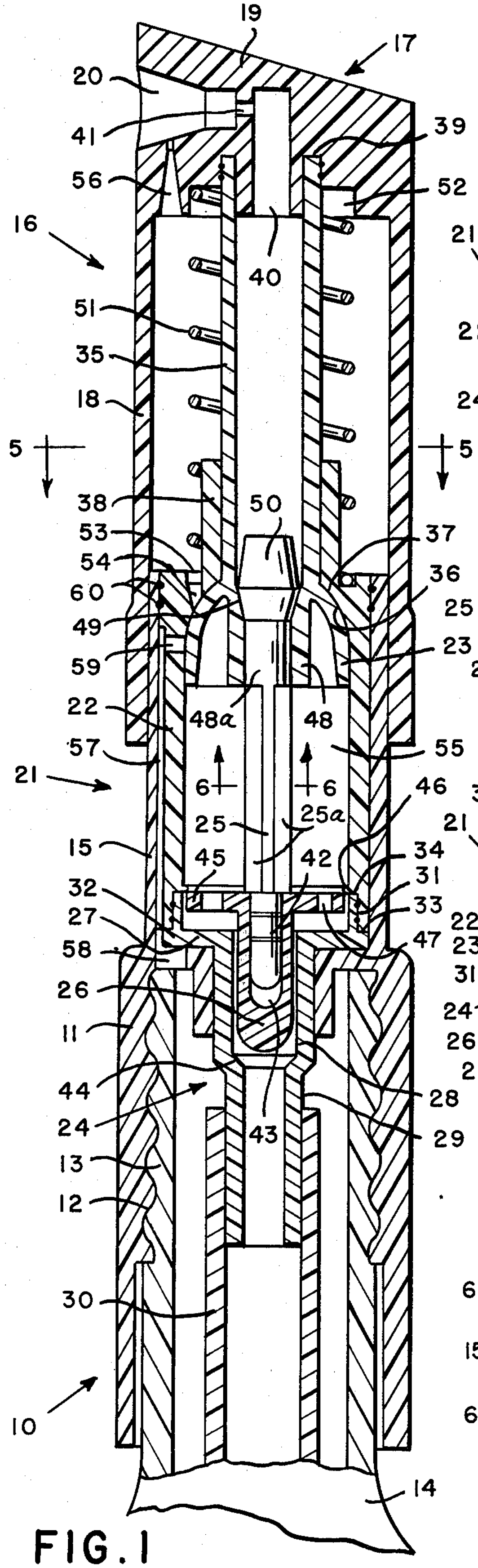
FIG. 1 is a vertical section of the liquid dispenser of the present invention in normal inactive position.

As shown in the accompanying drawings, the atomizing liquid dispenser of the present invention comprises a base 10 which has a cap portion 11 having internal threads 12 adapted to fit the threaded neck 13 of a container, such as a can or bottle 14 from which the liquid is to be drawn.

Projecting upwardly from the cap portion 11 and preferably integral therewith is a sleeve 15 on which is mounted an acutator 16 having a finger rest 17 and a tubular portion 18 telescopically slidably mounted on the sleeve 15. The top portion 19 of the actuator is formed with a spray nozzle 20.

Figure 3:
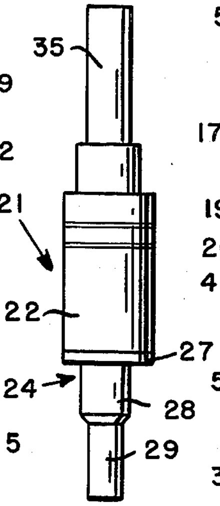
FIG. 3 is an elevation of a pump unit.
Figure 4:
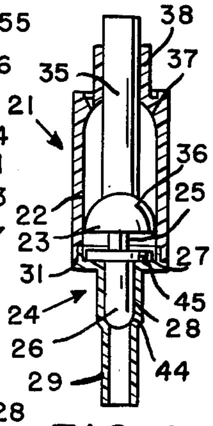
FIG. 4 is a vertical section of the pump unit showing the piston rod in the position it can occupy while being shipped or before being assembled with the base and actuator parts.
Figure 7:
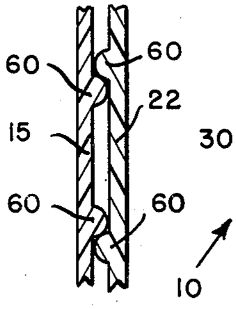
FIG. 7 shows the snap rings used to lock the several parts in assembled condition.

Mounted in the space between the base portion 10 and the actuator 16 is a pump unit 21 shown in FIGS. 3 and 4. For convenience in manufacture, the pump unit 21 is formed of five preferably molded plastic parts, to wit, a cylinder 22, a piston 23, a dip tube adapter 24, a valve stem 25 and a valve 26.

The dip tube adapter 24 has a circular plate 27, an integral well portion 28 terminating in a small tube 29 adapted to slidably receive a dip tube 30 which extends into a container with its bottom end adjacent the bottom of the container.

The plate 27 has an upwardly extending flange 31 positioned inwardly from its peripheral edge 32 to receive the bottom edge portions 33 and 34 of the cylinder 22.

Preferably integrally connected to the piston 23 is a hollow piston rod 35, the lower end of which has an integral spherodial piston head 36 which is shaped to conform to and engage a spheroidal valve seat 37 adjacent the top of the cylinder 22. The piston rod 35 extends through and is guided in its longitudinal movements by a collar 38 at the upper end of the cylinder 22. The upper end of the hollow piston rod 35 is secured in a circular groove 39 in the top 19 of the actuator and communicates with a passage 40, spray orifice 41 and flared spray nozzle 20 from which the liquid is discharged.

The valve stem 25 has at its lower end a reduced portion 42 which projects into and is secured in a cavity 43 in the valve 26 which lies in the well portion 28 of the dip tube adapter 24. The valve 26 has a rounded end which engages a valve seat 44 at the bottom of the well portion 28. The diameter of the valve 26 is slightly less than the internal diameter of the well portion 28 so that liquid may flow past the valve into the cylinder 22 when the valve stem 25 is in its upper position as shown in FIG. 1. The movements of the lower end of the valve stem 25 are guided by a flange 45 formed integrally with the valve 26, the edge of the flange 45 engaging the upstanding flange 31 on the dip tube adapter and a stop ring 46. The flange 45 has passages 47 through which the liquid may freely flow during the operation of the pump.

When assembled, the upper end of the valve stem 25 lies in the hollow piston rod 35 and is supported by the inner surfaces of a collar 48 projecting from the restricted portion of the tube which acts as a valve seat 49 for a valve 50 on the upper end of valve stem 25 when the latter is in its dormant position shown in FIG. 1.

Figure 6:
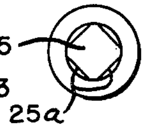
FIG. 6 is a transverse section of the valve stem taken on the line 6—6 of FIG. 1.

As shown in FIGS. 1 and 6, the valve stem 25 has flat surfaces **25*a* extending between the valve portion 48*a* and the flange 45 so that the liquid in the cylinder 22 may flow upwardly past the collar 48** when the piston descends to dispense the liquid.

The actuator 16 is held in its uppermost position of rest by a coil spring 51 having its upper end lying in the groove 52 in the underside of the finger rest 17 of the actuator and its lower end in a groove 53 in the top of the cylinder 22 surrounding the collar 38 thereof.

A vent aperture 54 in the top of the cylinder 22 allows air to escape from and enter the space 55 above the piston head 36 as the piston reciprocates. The air so moved passes through the vent aperture 56 leading to the nozzle 20.

Figure 5:
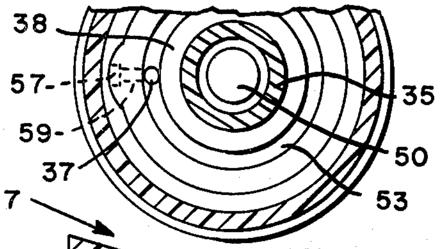
FIG. 5 is a transverse section of the dispenser taken on the line 5—5 of FIG. 1.
Figure 2:
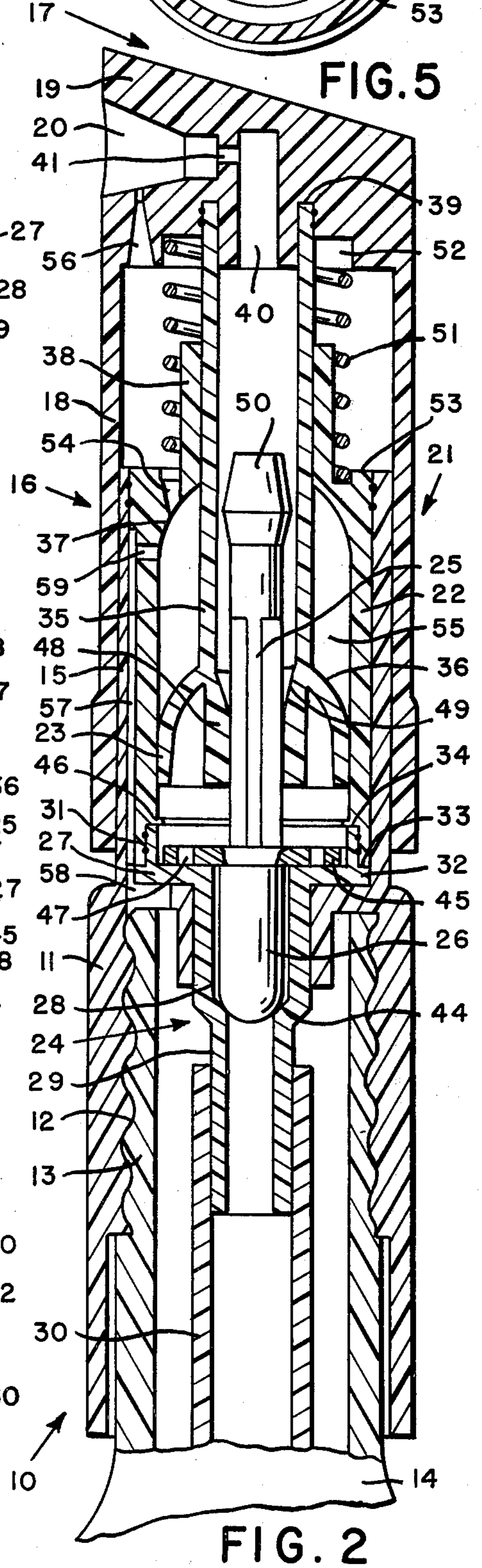
FIG. 2 is a similar view showing the parts in their depressed position.

In order to vent the container 14 so that the liquid therein may be drawn up by the rising movement of the piston 36, the cylinder 22, as shown in FIGS. 1 and 5, has a longitudinal groove 57 which at its bottom end communicates with a passage 58 in the top of the cap portion 11 leading to the interior of the container 14. At the upper end of the groove 57 the cylinder 22 has a transverse passage 59 which is closed when the piston head 36 is in its normal position of rest as shown in FIG. 1. When the piston head 36 descends due to finger pressure on the finger piece 17, the transverse passage 59 is opened thus normalizing the pressure of the air in the container 14. When the piston head 36 rises causing the liquid to be drawn from the container 14 into the cylinder 22, air will enter the space 55 through the vent 54 and pass down through the groove 57 and passage 58 to the interior of the container.

ASSEMBLY

In assembling the pump unit, the valve stem 25 is dropped in the upper end of the hollow piston rod 35 and allowed to extend beyond the lower end of the latter so that the reduced end 42 may be forced into the cavity 43 in valve 26 and flange 46 where it is held by snap rings. The assembly is then inserted in the cylinder 22 through the open end thereof. The cylinder 22 is then press-fit and snap-locked in the flange 31 of the dip tube adapter.

The complete pump unit may then be assembled with the base 10 by placing the cylinder 22 in the sleeve 15 of the base 10 with dip tube adapter 24 extending into the base 10 and press-fit to snap-lock the parts together by the snap rings 60. Then the spring 51 is placed around the piston rod 35, and the tubular portion 18 of the actuator 16 is slid over the sleeve 15 of the base causing the upper end of the piston rod to be snap-locked in top portion 19 of the actuator.

OPERATION

After the usual closure cap has been removed from the liquid container, the base portion 10 of the liquid dispenser is secured on the neck of the container with the dip tube adapter 24 and dip tube 30 extending into the liquid therein.

When it is desired to produce a spray of liquid, the user applied finger pressure to the finger rest 17 of the actuator 16. This causes the hollow piston rod 35 and piston 36 to descend, moving the collar 48 away from a valve portion 48*a* on the valve stem 25 thereby allowing the air in the cylinder 22 to escape past the valve stem 25 (the valve seat 49 having moved off the valve 50), through the hollow piston rod 35, passage 40, orifice 41 and spray nozzle 20, the valve 26 on the lower end of the valve stem 25 being engaged with the valve seat 44 on the dip tube adapter.

Finger pressure on the finger rest 17 being then relaxed, the spring 51 causes the piston 23 and piston rod 35 to rise creating a partial vacuum in the cylinder 22 with the result that the liquid in the container is drawn past the valve 26 into the cylinder 22 thus causing the pump to be primed. On the next stroke of the actuator 16 the piston rod 35 descends causing the piston 23 to apply pressure to the liquid in the cylinder 22 which then is forced upwardly through the space between the collar 48 and the valve portion 48*a* past the valve 50 into the hollow piston rod 35, through the passage 40, orifice 41, and out through spray nozzle 20, the valve stem 25 being forced downwardly by pressure of the liquid in the cylinder 22 on the plate 27 causing the valve 26 on the valve stem 25 to engage the seat 44 on the dip tube adapter and prevent the flow of liquid back into the container.

When the finger pressure is removed from the finger rest 17, spring 51 moves the piston 23 upwardly again creating a partial vacuum in the cylinder 22 which causes the valve 26 to be unseated allowing liquid to be drawn into the cylinder 22 where it will be retained until the next depression of the finger rest 17.

By providing for the insertion of the valve stem through the open upper end of the piston rod, for instance by making the guide flange 45 as a structurally separate piece, it is possible to make the collar 48 and the valve portion 48*a* to have a close substantially unyielding engagement, with sufficient compression between the engaging surfaces to prevent leakage from the hollow piston rod into the cylinder, and thereby retain the cylinder prime for the next operation of the actuator.

Variations and modifications may be made within the scope of the claims and portions of the improvements may be used without others.

I claim:

1. A liquid dispenser for attachment to a liquid container comprising two telescopic sleeves slidably connected together, one sleeve comprising a base section having means to engage the mouth of a container and the second sleeve comprising an actuator section having a finger rest and a spray nozzle; spring means located between said finger rest and said second sleeve for yieldably holding said base section and said actuator section in extended condition; and a pump unit sandwiched in toto between said base section and said actuator section, said pump unit having a cylinder having an inlet portion having a dip tube adapter and an outlet portion communicating with said spray nozzle of said actuator section to force liquid drawn from the container out through said nozzle when said base section and actuator section are reciprocated relatively by manual force applied to said finger rest and force applied by said spring.

2. A pump unit for a liquid dispensing attachment for liquid containers comprising a cylinder; a piston head slidably mounted in said cylinder for movement to and from a position of rest thereon and having a tubular piston rod projecting through one end of said cylinder and communicating with the atmosphere; a dip tube adapter secured to said cylinder and projecting therefrom and having an inlet valve seat; a valve stem extending axially through said piston rod into said cylinder, said piston rod having a valve seat and said valve stem having a first valve adapted to engage said valve seat and limit the movement of the valve stem inwardly of the piston rod and control and the flow of liquid from said cylinder to said piston rod, said valve stem having a second valve to engage said inlet valve seat on said dip tube adapter and controlling the flow of liquid from said dip tube adapter to said cylinder.

3. A pump unit according to claim 2 in which said second valve and the end of said valve stem are initially separate pieces shaped to be slidably assembled and locked together as so assembled after said valve stem has been positioned in said piston rod and before the dip tube adapter is secured to said cylinder.

4. A pump unit according to claim 3 in which is a guide flange on the lower end of said valve stem, said flange being integral with said second valve.

5. A pump unit according to claim 2 in which said cylinder has at one end a spheroidal valve seat and said piston head has a complementary spheroidal valve to make liquid sealing engagement with said spheroidal valve seat when said piston is in said position of rest.

6. A pump unit according to claim 2 in which said piston head has a cylindrical valve seat portion and said valve stem has a cylindrical valve to make liquid sealing engagement with said valve seat when said piston is in said position of rest.

7. A pump unit according to claim 2 in which there is a guide flange integral with said first valve and formed with a central socket, and said valve stem has an end portion shaped to be pressure-fitted in said socket and locked thereon by snap rings.

8. A pump unit according to claim 2 in which said dip tube adapter is secured to the cylinder by a flange inserted in the bottom of the cylinder, said flange on the dip tube adapter and said cylinder being locked together by snap rings.

* * * * *